(12) United States Patent
Buter et al.

(10) Patent No.: US 9,421,859 B2
(45) Date of Patent: Aug. 23, 2016

(54) FIBER COMPOSITE WHEEL WITH ELECTRIC MOTOR AND DAMPING

(71) Applicant: Fraunhofer-Gesellschaft zur Forderung der angewandten Forschung e. V., Munich (DE)

(72) Inventors: Andreas Buter, Darmstadt (DE); Andreas Giessl, Bovenden (DE); Oliver Schwarzhaupt, Frankfurt (DE); Nicole Schweizer, Darmstadt (DE)

(73) Assignee: Fraunhofer-Gesellschaft zur Forderung der angewandten Forschung e.V., Munich (DE)

( * ) Notice: Subject to any disclaimer, the term of this patent is extended or adjusted under 35 U.S.C. 154(b) by 611 days.

(21) Appl. No.: 13/692,779

(22) Filed: Dec. 3, 2012

(65) Prior Publication Data

US 2013/0162006 A1    Jun. 27, 2013

Related U.S. Application Data

(60) Provisional application No. 61/566,387, filed on Dec. 2, 2011.

(51) Int. Cl.
*B60B 5/02* (2006.01)
*B60K 7/00* (2006.01)

(52) U.S. Cl.
CPC .............. *B60K 7/0007* (2013.01); *B60B 5/02* (2013.01); *B60K 2007/0038* (2013.01); *B60K 2007/0092* (2013.01); *Y10T 156/10* (2015.01)

(58) Field of Classification Search
CPC ............. B60B 5/02; B60K 2007/0038; B60K 2007/0092; B60K 7/0007; Y10T 156/10
See application file for complete search history.

(56) References Cited

U.S. PATENT DOCUMENTS

| 6,530,624 | B2* | 3/2003 | Stach ........................ B60B 1/08 301/65 |
| 6,710,498 | B1* | 3/2004 | Lee ..................... H02K 15/0012 310/211 |
| 7,528,518 | B2 | 5/2009 | Maeda et al. |
| 8,172,020 | B2 | 5/2012 | Gilmore et al. |
| 2010/0301712 | A1* | 12/2010 | Amutham .............. H02K 21/22 310/68 B |
| 2011/0139523 | A1 | 6/2011 | Chen |

FOREIGN PATENT DOCUMENTS

| DE | 42 18 888 A1 | 12/1993 |
| DE | 195 48 117 A1 | 8/1996 |
| DE | 199 48 224 C1 | 6/2001 |
| DE | 10 2006 002 421 A1 | 7/2002 |
| DE | 101 00 861 A1 | 7/2002 |
| DE | 10 2009 038 928 A1 | 11/2010 |

(Continued)

*Primary Examiner* — John Walters
*Assistant Examiner* — Hilary L Johns
(74) *Attorney, Agent, or Firm* — Seed Intellectual Property Law Group PLLC

(57) ABSTRACT

One or more embodiments of the present invention concerns a wheel body of a wheel of an electric vehicle including a rim body with a rim portion for receiving a tire and a spoke portion for carrying the rim portion on a bearing for rotatably mounting the rim body on a wheel axle, a motor receiving body for receiving an electric motor for driving the wheel, and the motor receiving body includes an outer, radially surrounding receiving portion for receiving and fixing an outer part of the electric motor, which part is rotatable relative to the wheel axle.

14 Claims, 6 Drawing Sheets

(56) References Cited

FOREIGN PATENT DOCUMENTS

| DE | 10 2010 049 622 A1 | 6/2011 |
| DE | 11 2009 001 232 T5 | 6/2011 |
| DE | 10 2010 016 844 A1 | 11/2011 |
| EP | 0 520 942 A2 | 12/1992 |
| EP | 1 223 068 A1 | 7/2002 |
| EP | 1 380 459 A1 | 1/2004 |
| IT | EP 0464929 B1 * | 2/1995 | ............... B61C 9/46 |
| WO | 96/21965 A1 | 7/1996 |
| WO | 2004/067295 A1 | 8/2004 |
| WO | 2007/141841 A1 | 12/2007 |
| WO | 2011/138181 A1 | 11/2011 |

\* cited by examiner

FIBER COMPOSITE WHEEL WITH ELECTRIC MOTOR AND DAMPING

BACKGROUND

1. Technical Field

The present invention concerns a wheel of an electric vehicle and a wheel body of a wheel of an electric vehicle. The invention further concerns a process for the production of a wheel body of a wheel of an electric vehicle. The invention also concerns an electric vehicle.

2. Description of the Related Art

Electric vehicles are common knowledge. They were developed to find alternatives to motor vehicles using a diesel engine or an Otto-cycle engine. Initially developments of electric vehicles were based on known motor vehicles, wherein firstly the internal combustion engine was replaced by an electric motor and in addition the approach pursued was that of making the vehicle overall more economical. In that respect the attempt was made in particular to reduce the size and weight of the vehicle.

With increasing development in electric vehicles, this became established as an independent technical field in which use was also made of particularities of electric drives in relation to established drives by internal combustion engines. They include for example good measurement and control options for an electric motor and also the fact that electric motors can usually manage without a transmission.

In addition electric motors are suitable for a design or structure of a motor vehicle, in particular a private automobile, in which there is an individual electric motor for each wheel, in particular at each wheel. In this connection in particular a so-called wheel hub motor is also known, in which each wheel is equipped with its own motor in the rim. That however suffers from the disadvantage that such a wheel is of a high mass and accordingly involves in particular a high moment of inertia. Furthermore a motor arranged in the rim is exposed to more severe shock loadings than a motor mounted in the body of the motor vehicle.

In addition electric motors are usually also suitable for the generator mode of operation. To be technically correct in this case these are known as electric machines, in the case of an electric vehicle however the motor mode of operation is by far the predominant mode so that the term motor is used, which however also includes the possibility of a generator mode.

BRIEF SUMMARY

One or more embodiments of the invention seeks further to improve an electric vehicle in its efficiency, stability and/or durability.

According to an embodiment of the invention there is proposed a wheel body of a wheel of an electric vehicle. The wheel body is thus part of a wheel and includes a rim body and a motor receiving body.

BRIEF DESCRIPTION OF THE SEVERAL VIEWS OF THE DRAWINGS

The invention is described in greater detail hereinafter by way of example by means of embodiments with reference to the accompanying Figures.

DETAILED DESCRIPTION

Figure 1:
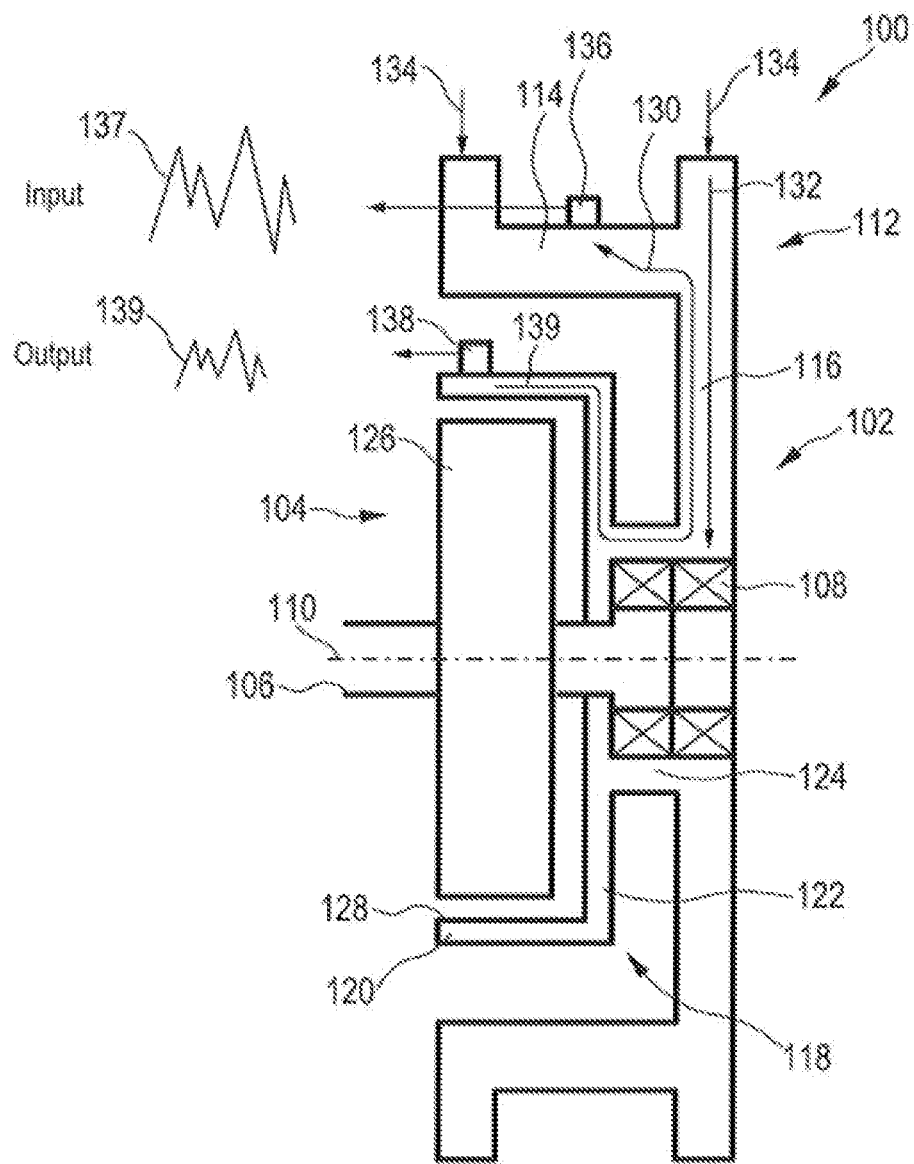
FIG. 1 diagrammatically shows a side or sectional view of a wheel according to one embodiment of the invention.

The rim body includes a rim portion for receiving a tire and the rim body includes a spoke portion for carrying the rim portion on a bearing for rotatably mounting the rim body on a wheel axle. The spoke portion thus concerns the region between the outer tire receiving region and the inner wheel axle or tub region. In that respect the term spoke portion is not to be interpreted so narrowly that it is to be formed from spokes in the classic sense as in a usual bicycle. The spokes can be of many different configurations and the spoke portion can basically also be in the form of a disk or the like. At any event it represents a support portion and thus also a connecting portion between the rim portion which is radially outward and an axle receiving portion which is radially inward.

The motor receiving body is provided for receiving an electric motor for driving the wheel. The motor receiving body includes an outer, radially surrounding receiving portion for receiving and fixing an outer part of the electric motor to be received, which part is rotatable relative to the wheel axle. In particular the outer, radially surrounding receiving portion is intended to provide that said rotatable part of the electric motor is at least partially fitted into said receiving portion.

The motor receiving body further includes a transmission portion for transmitting to the spoke portion a torque acting on the receiving portion for driving the wheel. The motor receiving portion is thus of such a configuration that a flux of force, namely a drive torque generated by the electric motor, is transmitted from the electric motor to the outer, radially surrounding receiving portion and from there further transmitted by way of the transmission portion in order then to be further transmitted thereby to the spoke portion of the rim body. In particular therefore the transmission portion of the motor receiving body is designed and adapted to transmit a torque, that is to say a force directed in a direction of rotation.

The transmission portion of the motor receiving body is connected in a connecting region to the spoke portion of the rim body. In particular here, namely in that connecting region, the torque is to be transmitted from the motor receiving body to the rim body. The connecting region is also suitably adapted, namely for the transmission of a rotary force.

It is further provided that the motor receiving body is spaced in the radial direction relative to the rim portion in the region of the outer receiving portion. In that region therefore there is no direct contact between the motor receiving body and the rim portion and this therefore also in particular prevents a radial or lateral force, namely in particular a shock force which occurs when driving the vehicle from being transmitted directly to the motor receiving body, in particular the receiving portion and thus the motor. This therefore provides for decoupling of the force fluxes, namely on the one hand transmission of the drive torque and on the other hand in particular unwanted force shocks and impacts which act on the rim from the road.

Preferably the rim body and/or the motor receiving body is/are made substantially from a fiber plastic composite or consists/consist thereof. They can each completely comprise a fiber plastic composite or extraneous materials can be present to a small extent such as fitment elements for connecting purposes and/or incorporated elements such as reinforcing foam elements or coatings such as lacquer or paint to give just some examples. At any event in accordance with this embodiment it is proposed that the shape, stability, weight and/or structure is or are determined by the fiber plastic composite.

In one embodiment, the receiving portion of the motor receiving body is of a smaller outside diameter than the connecting region in which the transmission portion of the motor receiving body is connected to the spoke portion of the rim body. Insofar as the receiving portion and/or the connecting region are not of a cylindrical configuration, the term outside diameter is used in each case to denote a mean outside diameter for example in the arithmetic sense. Alternatively at least the largest outside diameter of the receiving portion is larger than the smallest outside diameter of the connecting region, in particular by at least 30%, preferably at least 50%, in particular at least 80%.

The different diameters are intended in particular to provide for separation of the force fluxes, namely the transmission of the drive torque on the one hand and transmission of impact forces to the rim on the other hand. Therefore due to the small outside diameter of the connecting region, a torque acting on the receiving portion first has to be transmitted inwardly by way of the transmission portion to the connecting region in order then to be transmitted outwardly from there to the rim portion by way of the spoke portion. In contrast a shock loading does not follow a corresponding reversed path, or follows same only in respect of a part thereof, because, due to its radial or lateral direction, it is guided or flows inwardly and not outwardly or less so from the connecting region again. That provides for good transmission of torque from the electric motor to the rim and thus ultimately to the tire while at the same time the electric motor is protected from shock impacts.

The use of fiber plastic composites provides a lightweight wheel or a lightweight wheel body in which an electric motor can be integrated and protected from road-induced shock loadings. It is further proposed that the fiber plastic composite be of such a nature, and in particular the fibers are to be so laid, that the transmission of a torque is favored at any event in the receiving portion and the transmission portion of the motor receiving body while the transmission of a radial or lateral shock force is prevented.

Preferably the structure of the wheel body is such that shock forces or movements are damped. Such damping can also be effected by a suitable arrangement of the fibers or fiber lay and also additionally or alternatively by the provision of additional materials such as for example foams which have a damping action in that respect. Such damping foams or other materials with a similar action can be incorporated into the fiber plastic composite by being arranged for example between a plurality of fiber layers.

Preferably the motor receiving body is spaced in the axial direction relative to the spoke portion in the region of the outer receiving portion. That prevents in particular shock forces being transmitted from the spoke portion directly to the receiving portion. In particular the motor receiving body is spaced in the region of the receiving portion both in the radial direction relative to the rim portion and also in the axial direction relative to the spoke portion and is thus separated in that region from the rim body. A connection in relation to the rim body is preferably provided only in an inner region near the wheel axle by way of the connecting region from the motor receiving body to the rim body or vice-versa.

It is desirable if the wheel body is of such a configuration that a torque acting on the outer receiving portion for driving the wheel is transmitted from the outer receiving portion of the motor receiving body by way of the inner transmission portion of the motor receiving body and the connecting region and the carrier portion of the rim body to the rim portion of the rim body, in which case a force acting radially on the rim body is transmitted to the bearing by way of the spoke portion.

In a configuration it is proposed that foam bodies for increasing the stability and/or flexural stiffness of the wheel body are incorporated in the rim body in a transitional region between the rim portion and the spoke portion. In particular such foam bodies are respectively arranged between two fiber layers of a fiber plastic composite. In particular in the transitional region between the rim portion and the spoke portion the rim body can be in the form of a peripherally extending angle or of an approximately L-shaped configuration in cross-section. It is precisely in that angular region that high loading forces can occur so that this reinforcement is proposed here. In that respect the foam body can respectively also simply provide that the rim body is of a very great thickness in the critical region without it having to be provided over the entire thickness thereof with the fiber plastic composite.

The use of fiber plastic composites (FPCs) affords a high level of lightweight structural potential by virtue of the high specific strengths and high specific stiffnesses involved. By virtue of a suitable construction the use of FPCs permits higher levels of structural damping, higher damage tolerances and higher degrees of elongation to fracture in comparison with metal. A further advantage of this lightweight structure in FPC is the possibility of functional integration.

Preferably therefore a wheel body can entirely or partially comprise fiber composite material. Preferably an electric motor is integrated and/or sensors are integrated.

In a configuration it is proposed that incorporated into the wheel body is at least one flexible portion, in particular an elastic and damping portion, for carrying shock loadings, wherein the at least one flexible portion is in the form of a passive portion and/or in the form of an active portion. The term flexible is used here in particular to denote non-rigid so that in particular a shock impact loading is partially absorbed in the at least one flexible portion. The portion is preferably elastic in the sense that after being subjected to a shock loading it returns to its original shape again. Such a reversal can occur in the sense of a spring-back effect but should preferably be damped so that a shock loading is absorbed without leading to a resilient oscillation.

Such a flexible portion can be in the form of a passive portion insofar as for example suitable materials like softer material are used. That can be for example an elastomer or also a glass fiber reinforced plastic.

Another variant provides that the flexible, in particular damping region, is achieved by suitable fiber orientation in the fiber plastic composite. It is thus possible for example to predetermine a fiber orientation which achieves a directionally dependent damping property depending on the respective arrangement of the fiber layers or fiber lay. For example the layers can be arranged in succession in the orientations of 0°, 45°, 90° and finally −45°.

Elasticity can also be achieved for example by the nature of its shaping. For example, portions, surfaces, or layers which are straight in the direction of the force or shock impact have little or no elasticity whereas instead the use of elements which are not entirely straight but slightly curved such as for example a concave or convex surface or layer configuration have a certain degree of elastic flexibility. It is also possible to provide bodies or portions of suitable shapes for elastic support. These include for example circular bodies which can have a higher degree of elasticity in comparison with rectangular bodies.

As an active portion, as a flexible and in particular elastic and damping portion, it is possible to provide a piezoceramic which upon compression outputs an electric voltage at electric terminals and conversely upon the application of a voltage leads to a corresponding movement, whereby an elastic movement can be controlled. Other active flexible portions can be for example oscillation absorbers or an active interface. A fluid damper can also be considered.

The term oscillation absorber is used here to denote an additional mass coupled to the component to be damped by springs and by a damping element. If a harmonic force acts on the main system, the overall system reacts harmonically after a short transient entry phase and it oscillates in a steady-state relationship with the exciter frequency. An active interface which can also be referred to as an active bearing with parallel application of force uses an actuator which is decoupled from a static loading.

In accordance with a further configuration fluid dampers and/or frictional dampers are proposed for oscillation reduction, namely in particular in regions between the wheel body and the motor receiving body. Often the fluid damper is to be preferred to the frictional damper because a generally constant frictional force can be added to deceleration forces of a spring and subtracted from their acceleration forces and thus distorts the harmonic oscillation movement and can lead to excessive levels of acceleration. Preferably damping of the oscillations is to be achieved solely by fluid dampers with speed-dependent damping force.

Further fundamental aspects and discussions relating to said dampers can be found from textbooks.

According to the one or more embodiments of the invention there is also proposed a wheel having a wheel body according to one of the foregoing embodiments, which has a wheel axle and a wheel bearing. The wheel axle is provided for fixing to the electric vehicle and the wheel bearing is provided for arrangement on the rotational axle in order thereby to rotatably mount the rim body on the wheel bearing, on the wheel axle. In addition there is provided an electric motor having a rotating part and a stationary part which are supported rotatably relative to each other. The stationary part is fixedly connected to the wheel axle and the rotating part is fixedly connected to the receiving portion of the motor receiving body. The electric motor can thus exert on the receiving portion a torque which is further transmitted to the spoke portion for driving the wheel.

Thus there is provided a correctly functional wheel of an electric vehicle which also has the electric motor. It can be fixed to the vehicle by way of the wheel axle and can be actuated by way of the motor to move the motor vehicle and possibly also to receive electric energy again upon braking. The use of the wheel body provides a lightweight structure, while in addition the wheel body provides for decoupling of force fluxes, more specifically in such a way that a torque exerted by the electric motor is transmitted to the rim portion by way of the receiving portion, the transmission portion, the connecting region and the spoke portion, and the rim portion can further transmit that torque to a tire fitted thereon. Shock loadings, coming by way of a tire, are transmitted to the rim portion and from there further by way of the spoke portion to the wheel bearing and are transmitted either not at all or to a slight extent only to the electric motor. An electric vehicle can be designed with such wheels in particular in such a way that each wheel, in particular each of the four wheels, is designed in that way, namely each wheel has an electric motor. It is preferably proposed that there is also provided a spare wheel with electric motor.

Preferably a synchronous motor is proposed as the electric motor, the rotating part having permanent magnets. That avoids electric actuation of the rotating part and thus also avoids any problem of a power supply to that rotating part and thus any slip ring bodies. The stationary part can be in particular in the form of a stator in the electric-engineering sense and can provide a rotating field in order thereby to drive the permanent magnets and therewith the wheel body and thus accordingly the wheel.

Preferably the rotating part is entirely or partially incorporated into the motor receiving portion. That can involve in particular the permanent magnets insofar as this variant is adopted, which in this case are preferably incorporated in the fiber plastic composite. In this case the motor receiving portion can operate as part of the electric motor, namely as a supporting frame structure for the rotating part of the electric motor. In that way a part of the electric motor can be accommodated in the fiber plastic composite, in a unitary manner of manufacture. In particular the kind and nature of the structure of the fiber plastic composite, in particular the nature and orientation of the fiber directions can be adapted to the forces to be carried thereby, namely in particular to the torques to be carried.

Preferably the electric motor is integrated in such a way that its essential components like permanent magnets and/or possibly electromagnets are integrated directly in the fiber composite structure.

The motor receiving body which can also be referred to as the motor bell is preferably of such a configuration that a high specific strength of the fiber composite produces high inherent frequencies with relatively high inherent damping or low sound emission or such that the inherent frequency of the motor bell is so high that it cannot be excited in an unwanted fashion and in particular cannot be excited in such a way that loud noises are generated thereby.

One possibility for high or still higher inherent frequencies is the use of high-modulus fibers which are usually also abbreviated to HM fibers and which make it possible to achieve in particular high levels of inherent frequency at a high level of inherent damping.

The choice of the materials should be made on the basis of the following diagram (Michaeli/Wegener; Introduction to the Technology of Composite Materials; Munich, Vienna; Hanser Verlag 1989), wherein preferably materials are taken from the hatched regions, in particular the hatched region shown as an approximately L-shape. This has regions involving a practicable combination of specific tensile strength in relation to density, and of the specific modulus of elasticity in relation to density. The following abbreviations are used therein, the English identifications of which are also usual for the man skilled in the art in countries which are not English-speaking like Germany so that the English identifications are also indicated, also showing the origin of the abbreviations:

HM=high modulus, high-modulus fiber type,
HST=high strain to failure, highly stretchable fiber type,
IM=intermediate modulus, high-strength fiber type with a high E-modulus, and
HT=high tensity, high-strength fiber type.

The high-strength fiber type HT is inexpensive in comparison with the high-modulus fibers which more specifically are annealed at high temperatures. In an embodiment of the invention, the use of the IM fibers is proposed as a good compromise which is practicable for the present invention, having higher strength and a higher stretch capability than the HT fibers, but being generally markedly less expensive than the high-modulus fibers HM. That configuration takes account of good mechanical properties, having regard to procurement values which can be employed.

It is preferably proposed that windings of the electric motor comprise and/or have carbon fibers which are preferably incorporated into the windings, in particular in such a way that the windings are laminated into the fiber composite material. In particular it is proposed that the carbon fibers form part of a rotor of an asynchronous machine, in particular entirely or partially form a squirrel-cage rotor. That makes it possible to achieve advantageous integration of the motor into the materials used, in particular the fiber plastic composite. Preferably a suitable current consumption is made possible by a suitable diameter for the motor and/or parts of the motor, in particular the rotor, are connected in parallel to achieve a suitable current consumption.

In a further embodiment it is proposed that magnets are fitted into the plastic. Those magnets can be for example glued together or can be held in a ring-shaped structure by a ring. There are further possible options for fixing the magnets in relation to the magnet ring. They include the magnet ring being in or laminated into the fiber composite or by the fiber composite being cast therearound.

In still a further embodiment it is proposed that magnetic powder is cast in resin into a desired shape, in particular in a ring shape, and the shape formed in that way is integrated into the fiber composite. This can also be implemented for example by adhesive, by casting it therearound or by laminating it in place. In particular for that purpose the magnetic powder is mixed with the resin and the resulting dispersion is cast into the desired shape.

In particular the wheel is equipped with the electric motor in such a way that only the drive torque is transmitted, but the electric motor is otherwise not disposed in the radial and lateral force flux or the latter can be disregarded in the region of the electric motor. Preferably the electric motor is decoupled by the provided structural elasticities which inter alia have already been described hereinbefore, in such a way that no impact shocks are transmitted thereto or such shocks are negligible or are at least relatively damage-free in terms of the electric motor. That therefore provides for impact shock decoupling.

Such structural elasticities can also be implemented by fiber-reinforced plastics, in particular the nature and manner of their arrangement. One possibility of such structural elasticities is implemented by the choice of a suitable configuration, as was already described hereinbefore. Such a configuration is to be interpreted as a structural elasticity in the passive sense, wherein for example it is proposed that active elasticity is to be implemented by the use of integrated actuators such as for example piezoceramic actuators or other electric actuators. It is then possible to influence the elasticity, in nature and amplitude and thus including nature and amplitude of its damping, by using regulating technology by active actuation.

In addition in accordance with one or more embodiments of the invention there is proposed an electric vehicle having at least one of the above-described wheels, in particular having four such wheels as described hereinbefore. In other words it is proposed that the electric vehicle is designed in such a way that each wheel is a wheel according to the invention and has an electric motor. Naturally it is not only a vehicle such as a private automobile having four wheels or even more wheels that can be equipped with the wheels according to the invention with an electric motor, but such wheels are also suitable for use in an electric two-wheeler or electric three-wheeler.

In addition there is proposed a process for the production of a wheel body according to one of the foregoing embodiments. In that respect it is proposed that the wheel body overall or a respective part thereof, namely the rim body and/or the motor receiving body, is to be produced as described hereinafter. In that respect firstly a mold is used, corresponding to the wheel body, rim body or motor receiving body to be respectively produced, namely representing a negative shape in relation thereto. Fibers, fiber mats or fiber lays are then successively arranged on that mold and provided with a resin or other binding agent. Application of a resin or other binding agent can also be effected in such a way that the fibers, fiber mats or fiber lays already have that resin or binding agent upon being laid out, and in particular are impregnated therein.

That then affords a first layer. A second layer is then placed on that first layer, wherein the orientation of the fibers in the respectively following layer is turned through 45° relative to the previous layer, namely in particular the layer therebeneath. That affords a first layer involving an orientation of 0°, a second layer involving an orientation of 45°, a third layer involving an orientation at 90° and finally a fourth layer involving an orientation at 135° or −45°. The nature and manner of the arrangement of those layers can then be correspondingly continued. In other words preferably not just four layers but further layers are applied.

Preferably a foam body or a plurality of foam bodies is or are arranged between the layers and thus between the layer application steps. The foam bodies are preferably so arranged that they are later arranged in a corresponding region involving a high loading such as for example the transition from the spoke portion to the rim portion. In addition or alternatively elements of the electric motor, in particular permanent magnets, can be arranged between the layers individually or in a ring-shaped array. In that way a part, namely the rotating part of the electric motor, can be integrated into the wheel body in a simple and efficient and preferably structurally advantageous manner.

In principle the wheel body can be assembled from one piece or assembled from the rim body and the motor receiving body. Assembly of the two bodies is affected in particular in the connecting region and in that respect can be implemented by gluing and/or screwing and/or by connection by the resin or other binding agents.

FIG. 1 shows a wheel 100 according to one embodiment of the invention comprising a wheel body 102, an electric motor 104, a wheel axle 106 and a wheel bearing 108. An axis of rotation 110 about which the rotatable regions of the wheel 100 rotate is also shown. The view in FIG. 1 corresponds to a side view in section, wherein sectioned regions are illustrated without hatching and in other respects a part of the motor 104 is not sectioned.

The wheel body 102 includes a rim body 112 with a rim portion 114 and a spoke portion 116. There is also a motor receiving body 118 which has an outer, radially surrounding receiving portion 120 and a transmission portion 122. The transmission portion 122 is connected to the spoke portion 116 by way of a connecting region 124. In that way the motor receiving body 118 is connected to the rim body 112 by way of the connecting region 124.

The electric motor 104 has a stationary part 126 and a rotating part 128 which is incorporated into the receiving portion 120. The stationary part 126 is mounted fixedly on the wheel axle 106. The wheel body 102 is fixed rotatably on the wheel axis 106 by way of the wheel bearing 108. Thus the wheel body including rim portion 114 of the rim body 112 and including receiving portion 120 with incorporated rotating part 128 of the electric motor 104 is arranged rotatably about the axis of rotation 110. In that case a rotary movement is initiated by the stationary part 126 of the electric motor 104 on the rotating part 126 of the electric motor 104. In that case there is a torque which is transmitted from the receiving portion 120 by way of the transmission portion 122, the connecting region 124 and the spoke portion 116 to the rim portion 114. A tire which is also provided and which would be fitted on the rim portion 114 in operation is not shown here for the sake of clarity. The force flux of that torque transmitted from the electric motor 104 to the rim portion 114 is illustrated with the force flux part for the torque 130. A force flux for any impact shocks is illustrated by the force flux arrow for radial or lateral forces 132. The force flux of a radially or laterally acting impact shock force thus acts from the rim portion 114 by way of the spoke portion 116 on the wheel bearing 108.

For testing purposes and in the view for illustration purposes shock forces were applied to the rim portion 114 as indicated by the two impact shock arrows 134. They were measured at the rim sensor 136 and are illustrated as the 'input' 137 in FIG. 1. The resulting shock force is also measured with a receiving portion sensor 138 in the region of the receiving portion 120 and thus in the region of the rotating part 128 of the electric motor 104. The measurement result is here shown as the 'output' 139 as illustration at an amplitude which is less than the signal 'input'. Thus when an impact shock force acts radially on the rim portion 114 it is at most partially transmitted to the receiving portion 120.

Figure 2:
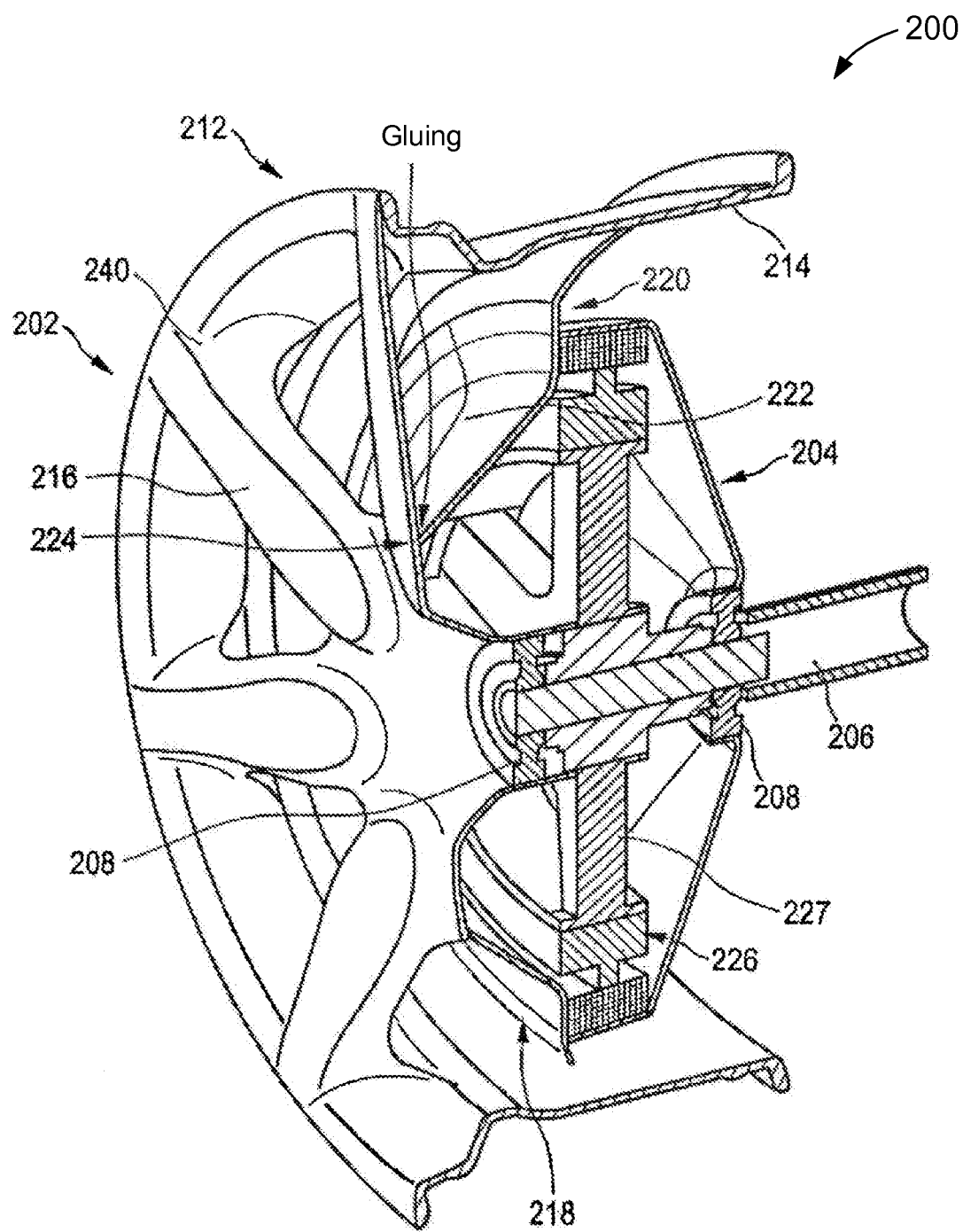
FIG. 2 shows a perspective sectional view of a wheel according to the invention in a further embodiment, FIG. 3 diagrammatically shows a side sectional view of a wheel body according to the invention in an embodiment, FIG. 4 diagrammatically shows a ring structure with different cross-sections for different damping properties for illustration purposes, FIG. 5 diagrammatically shows a ring structure for an embodiment of a wheel body with diagrammatically illustrated active damping elements, and FIG. 6 diagrammatically shows a stage in production of a wheel body.

FIG. 2 shows a perspective sectional view of a further embodiment of a wheel 200 according to the invention, wherein sectional surfaces are also shown without hatching in this case. The structure of this wheel 200 is quite similar to the diagrammatically illustrated structure of the wheel 100 in FIG. 1. Accordingly the wheel 200 in FIG. 2 has a wheel body 202, an electric motor 204, a wheel axle 206 and two wheel bearings 208 on the wheel axle 206.

The wheel body 202 includes a rim body 212 having a rim portion 214 and a spoke portion 216.

The wheel body 202 further includes a motor receiving body 218 having a receiving portion 220 and a transmission portion 222. The transmission portion 222 is connected to the spoke portion 216 in a connecting region 224 by an adhesive join. In this embodiment therefore the connecting region 224 is formed substantially by that adhesive join location and in this case involves only a slight axial orientation but a radial orientation, even if small. In this case also the connecting region 224 is of a markedly smaller outside diameter than the receiving portion 220.

The electric motor 204 has a stationary part 226 and a rotating part 228. The rotating part 228 is fixedly connected to the receiving portion 220. The stationary part 226 is fixedly secured to the wheel axle 206 by way of motor spokes 227. The stationary part 226 is thus provided to exert a torque on the rotating part 228, upon suitable actuation. A drive moment which is produced in that case is then further transmitted by way of the transmission portion 222 and the connecting region 224 to the spoke portion 216 and from there further finally to the rim portion 214. Any shock loadings on the rim portion 214 in contrast substantially result in a shock acting by way of the spoke portion 216 on at least one of the wheel bearings 208.

An increase in the strength of the wheel body 202 and in particular the rim body 212 can be provided for example by the incorporated foam elements in the region of a transitional region 240 from the rim portion 214 to the spoke portion 216.

The wheel body 202 comprises a fiber plastic composite, wherein the rim body 212 is produced integrally with the rim portion 214 and the spoke portion 216 and is fixedly connected to the motor receiving body 218 which in itself is also produced in one piece, with the receiving portion 220 and the transmission portion 222, by glueing in the region of the connecting region 224. Simple production is possible here insofar as the bodies, which are substantially decoupled from each other, of the rim body and the motor receiving body can be produced individually and can then be glued to form a wheel body 202 as illustrated.

Figure 3:
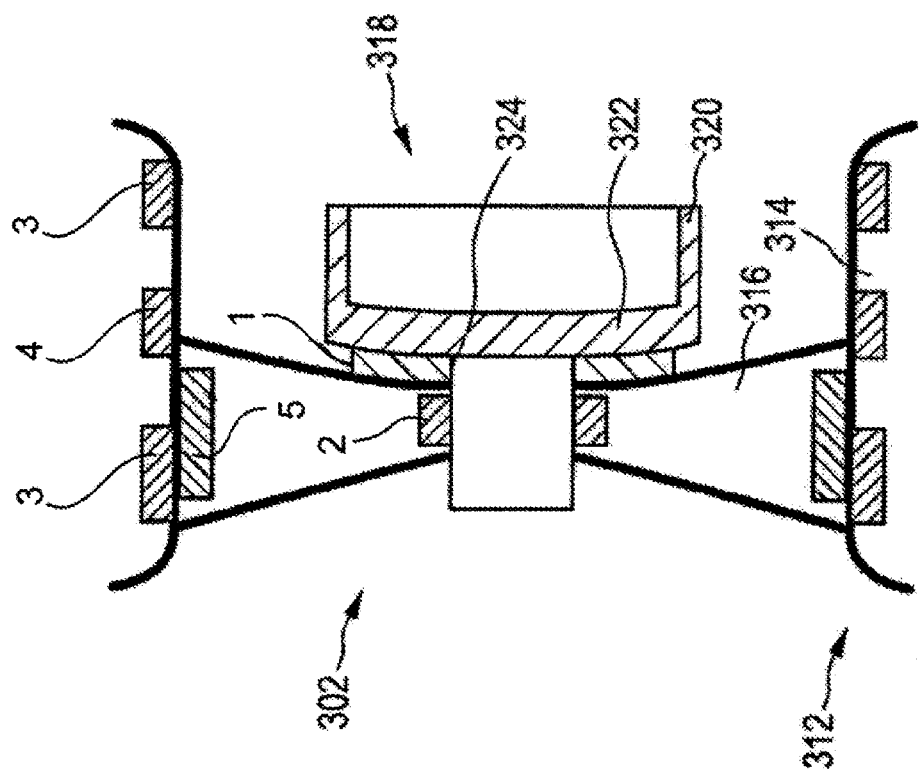

FIG. 3 is a diagrammatic side sectional view of a wheel body 302 illustrating measures and regions for impact shock reduction that are proposed in accordance with an embodiment. Such relevant regions are shown hatched in FIG. 3, whereas actual sectional areas in this diagrammatic view are shown without hatching. Diagrammatic areas which are hatched from bottom left to top right illustrate regions in which impact shocks are reduced, and in particular also shocks in the vehicle are reduced as a result. Regions which are hatched in opposite relationship, that is to say from top left to bottom right, show regions in which shocks towards the electric motor are isolated or which act for isolation of the electric motor in regard to radial shocks.

For that purpose FIG. 3 shows the wheel body 302 with the rim body 312 and the motor receiving body 318. It is noted that the view in FIG. 3 is basically in mirror-reversed relationship to the view in FIG. 1. In FIG. 3 the rim body 312 also has a rim portion 314 and a spoke portion 316. The motor receiving body 318 includes a receiving portion 320 and a transmission portion 322.

For reducing impact shocks the rim body 312 in its rim portion 314 has the illustrated regions 3 and 4 for reducing shocks and for that purpose the spoke portion 316 has the two regions 2 and 5. Thus in the region 5 which can also be identified as the transitional region between the rim portion and the spoke portion, incorporated foam regions can be provided in the fiber plastic composite. The regions 1 through 5 are particularly relevant regions for absorbing and/or damping shocks. They can be influenced by a suitable configuration in respect of the fiber layers and/or can be of an especial configuration. Preferably dampers can be provided in those regions.

The region 1 is illustrated for isolating shocks. In actual fact that region 1 denotes an intermediate space between the receiving portion 322 and the spoke portion 316. Those two portions are separated there and basically are only connected together by way of the connecting region 324. Thus on the one hand shocks are reduced in the rim body while on the other hand or in addition shocks occurring in the rim body 312 are substantially prevented from being passed to the motor receiving body 318 and thus the motor. It is proposed that fluid dampers and/or frictional dampers are arranged in the region 1.

Figure 4:
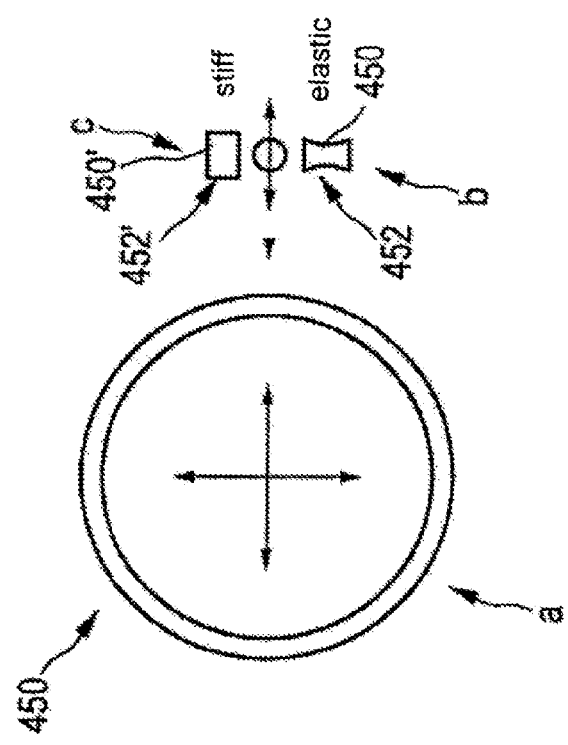

FIG. 4 shows a highly diagrammatic view of a circular ring 450 which could represent for example a rim body, a rim portion or spoke portion or part thereof, in particular a transition from the rim portion to the spoke portion. That circular ring 450 by way of example can be viewed as an elastomer damper or can include same. Accordingly it provides for damping by way of material and shape. The view b shows a section through the circular ring 450. That section shows two concave sides 452. Impact shocks which act on the circular ring 450 from above or below as illustrated by the view b can be accommodated or absorbed by virtue of the concave side.

For illustration purposes, a cross section of a modified circular ring 450' with a straight side 452' is shown as view c. By virtue of the straight configuration of the side surface 452', that side can scarcely yield to an impact force acting from above or below. The variant shown in the view c is thus substantially stiff.

Figure 5:
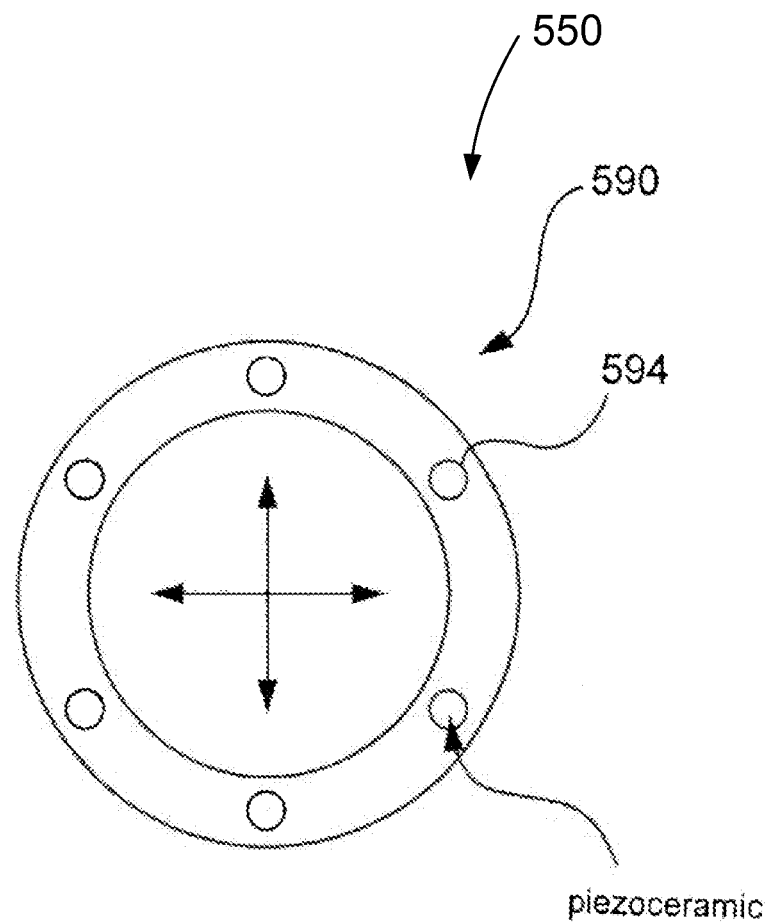

FIG. 5 also firstly shows quite generally a circular ring 550 which can be used in a similar manner as was described in relation to the circular ring 450 in FIG. 4. In principle use for the motor receiving body 118 of FIG. 1 can also be considered for that circular ring 550 and moreover also for the circular ring 450 in FIG. 4, in which respect the greatest impact shocks or the greatest amplitude thereof are to be expected in the rim body.

The circular ring 550 shown in FIG. 5 is equipped with a plurality of pf piezoceramics 554, such as six piezoceramics 554 shown by way of example. Any forces acting radially on the circular ring 550 act on at least one of the piezoceramics 554 and in that case can both lead to a corresponding signal and can also be actively damped by way of actuation of the piezoceramic 554. It is possible to provide for locally targeted reaction to impact shocks by the use of a plurality of piezoceramics 554 which is not limited to the number six.

One or more embodiments of the present invention thus provides a lightweight wheel for an electric vehicle, which is or can be each individually equipped with an electric motor. At the same time impact shock decoupling between travel shocks and the respective electric motor is achieved by way of the structural configuration and possibly further measures.

Figure 6:
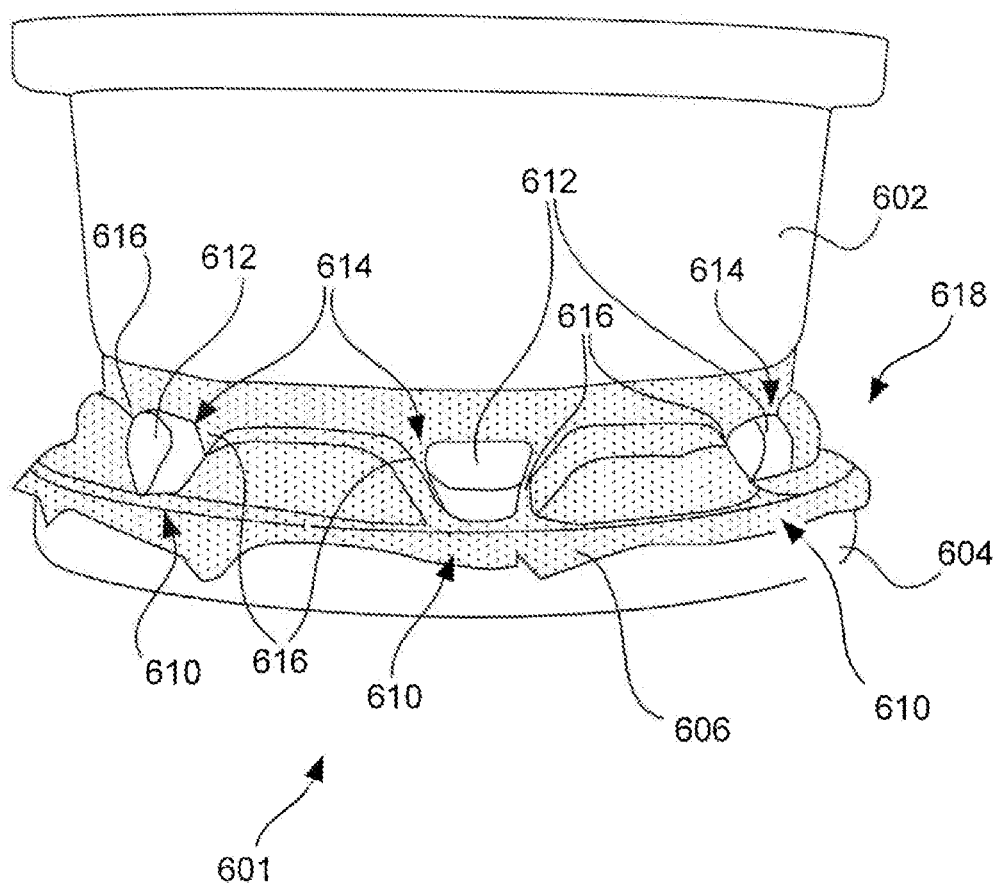
Figure 7:
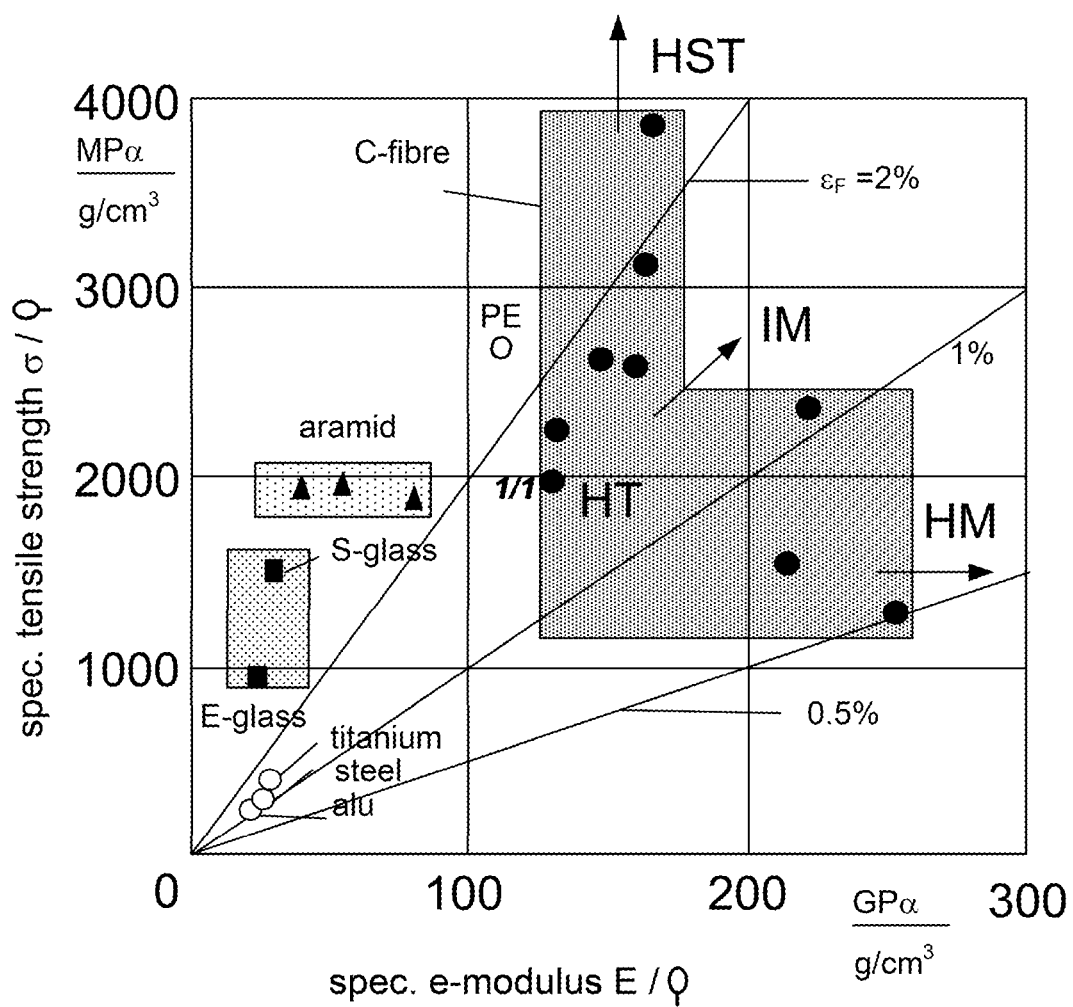
FIG. 7 is a graph illustrating properties of various materials.

FIG. 6 shows a mold 601 comprising two individual molds 602 and 604 for the production of a wheel body. First fiber mats 606 impregnated or pre-saturated with resin are laid in the connecting region 618 of the two individual molds 602 and 604. In that case a transitional region like the transitional region 240 shown in FIG. 2 is produced in that connecting region 618. Foam bodies 612 which can also be referred to as foam cores are placed in the damping regions 610, in hollow spaces 614, for damping and/or for increasing flexural stiffness.

Now as the next production step resin is injected into the free regions 616 of the hollow spaces 614, being the regions 616 which have remained beside the foam cores 612, so that each hollow space 614 is respectively filled with a foam core 612 and resin. Further fiber mats are then laid in place so that the foam cores 612 are enclosed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wheel body comprising:
a rim body that includes:
a rim portion configured to receive a tire; and
a spoke portion configured to carry the rim portion on a bearing for rotatably mounting the rim body on a wheel axle;
a motor receiving body configured to receive an electric motor for driving the wheel body, the electric motor having an inner stationary part and an outer rotating part, the motor receiving body including;
an outer receiving portion configured to receive and be fixed to the outer rotating part of the electric motor; and
a transmission portion coupled to the outer receiving portion and configured to transmit a torque acting on the receiving portion to the spoke portion for driving the wheel body, the transmission portion being spaced apart from the spoke portion of the rim body in a first direction that is substantially parallel to the axis of rotation; and
a connecting region that connects the transmission portion of the motor receiving body to the spoke portion of the rim body, the outer receiving portion being spaced apart from the rim portion in a second direction that is substantially perpendicular to the axis of rotation.

2. The wheel body of claim 1 wherein at least one of the rim body and the motor receiving body comprises a fiber plastic composite.

3. The wheel body of claim 2 wherein the fiber plastic composite is a fiber plastic composite with high-modulus fibers.

4. The wheel body of claim 1 wherein the receiving portion has an outside diameter that is larger than an outside diameter of the connecting region.

5. The wheel body of claim 4 wherein the outside diameter of the receiving portion is between 30% and 80% larger than the outside diameter of the connecting region.

6. The wheel body of claim 1 wherein the motor receiving body is spaced apart in an axial direction relative to the spoke portion in the region of the outer receiving portion and the wheel body is of such a configuration that a torque acting on the outer receiving portion for driving the wheel body is transmitted from the outer receiving portion of the motor receiving body by way of the transmission portion of the motor receiving body, the connecting region and the carrier portion of the rim body to the rim portion of the rim body, wherein a force acting radially on the rim body is transmitted to the bearing by way of the spoke portion.

7. The wheel body of claim 1 wherein a plurality of foam bodies configured to increase stability of the wheel body are included in the rim body in a transitional region between the rim portion and the spoke portion.

8. The wheel body of claim 1 wherein at least one flexible portion for receiving shock loadings is included in the wheel body, wherein the at least one flexible portion is at least one of a passive portion and an active portion.

9. A wheel comprising:
a wheel axle having an axis of rotation;
a wheel bearing;
an electric motor having a rotating part and a stationary part that are mounted rotatably relative to each other, the stationary part being fixedly connected to the wheel axle; and
a wheel body including:
a rim body that includes:
a rim portion configured to receive a tire; and
a spoke portion configured to carry the rim portion on the wheel bearing for rotatably mounting the rim body on the wheel axle; and a motor receiving body configured to receive the electric motor for driving the wheel, the motor receiving body including:
  an outer receiving portion configured to receive and be fixed to the rotating part of the electric motor; and
  a transmission portion coupled to the outer receiving portion and configured to transmit a torque acting on the receiving portion to the spoke portion for driving the wheel, the transmission portion being spaced apart from the spoke portion of the rim body in a first direction that is substantially parallel to the axis of rotation; and
  a connecting region that connects the transmission portion of the motor receiving body to the spoke portion of the rim body, the outer receiving portion being spaced apart from the rim portion in a second direction that is substantially perpendicular to the axis of rotation.

10. The wheel of claim 9 wherein the electric motor is a synchronous motor and the rotating part has permanent magnets.

11. The wheel of claim 10 wherein the rotating part is at least partially incorporated in the motor receiving portion.

12. The wheel of claim 11 wherein the motor receiving portion includes a plurality of permanent magnets.

13. An electric vehicle comprising:
at least one wheel that includes:
  a wheel axle;
  a wheel bearing;
  an electric motor having a rotating part and a stationary part that are mounted rotatably relative to each other, the stationary part being fixedly connected to the wheel axle; and
  a wheel body including:
    a rim body that includes:
      a rim portion configured to receive a tire; and
      a spoke portion configured to carry the rim portion on the wheel bearing for rotatably mounting the rim body on the wheel axle; and
    a motor receiving body configured to receive the electric motor for driving the wheel, the motor receiving body including:
      an outer receiving portion configured to receive and be fixed to the rotating part of the electric motor;
      a transmission portion coupled to the outer receiving portion and configured to transmit a torque acting on the receiving portion to the spoke portion for driving the wheel, the transmission portion being spaced apart from the spoke portion of the rim body in a first direction that is substantially parallel to the axis of rotation; and
      a connecting region that connects the transmission portion of the motor receiving body to the spoke portion of the rim body, and the outer receiving portion and the rim portion in a second direction that is substantially perpendicular to the axis of rotation.

14. The wheel body of claim 1 wherein the outer receiving portion being spaced apart from the rim portion in the second direction that is substantially perpendicular to the axis of rotation such that the electric motor is not disposed in a radial force flux or a radial force flux is disregarded in a region of the electric motor.

* * * * *